UNITED STATES PATENT OFFICE.

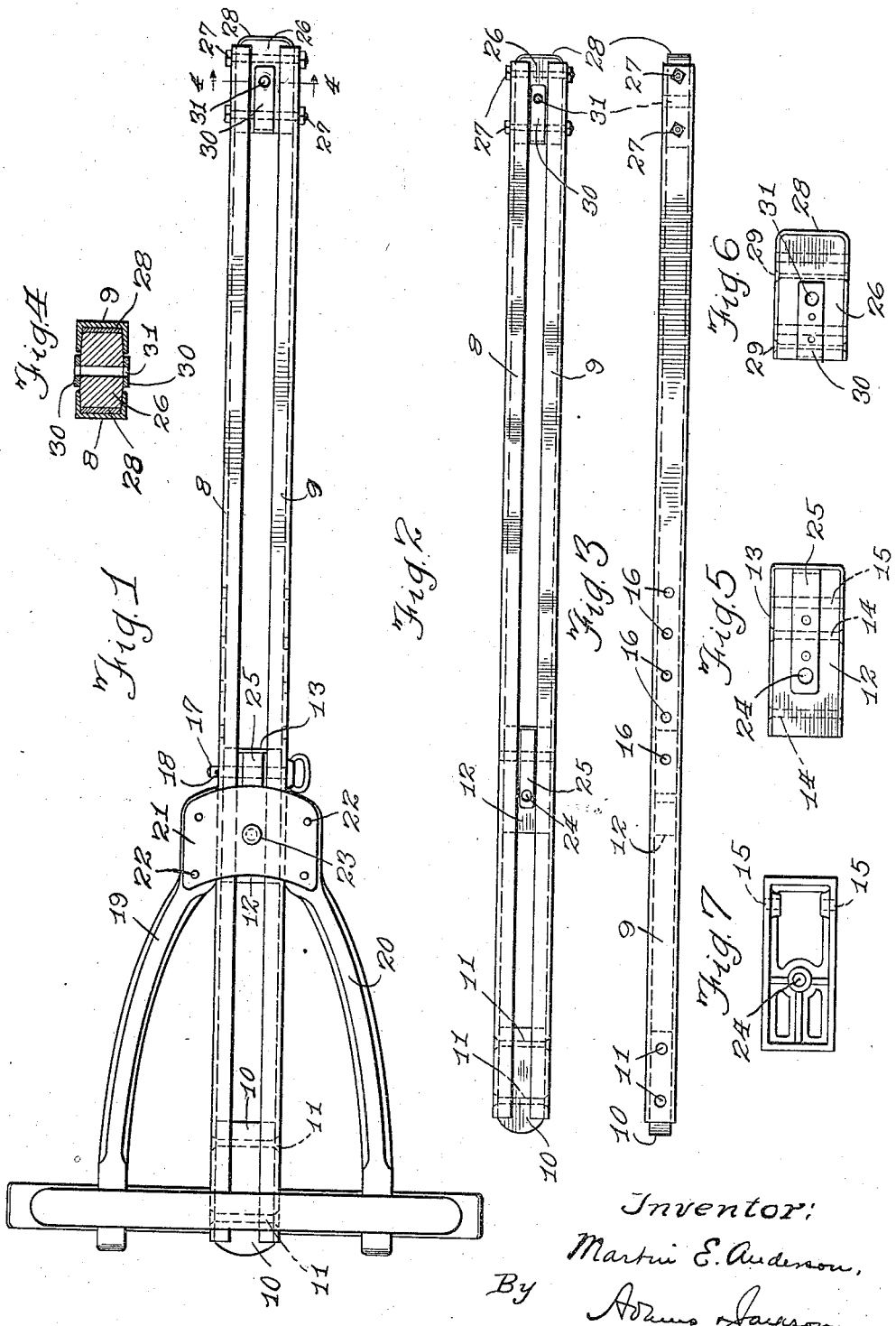

MARTIN E. ANDERSON, OF DE KALB, ILLINOIS, ASSIGNOR OF ONE-THIRD TO HIMSELF, ONE-THIRD TO FRANK G. ANDERSON, AND ONE-THIRD TO ANDREW O. ANDERSON, ALL OF DE KALB, ILLINOIS.

REACH FOR WAGONS, &c.

1,183,517.  Specification of Letters Patent.  Patented May 16, 1916.

Application filed August 23, 1915. Serial No. 46,841.

*To all whom it may concern:*

Be it known that I, MARTIN E. ANDERSON, a citizen of the United States, and a resident of De Kalb, in the county of De Kalb and State of Illinois, have invented a certain new and Improved Reach for Wagons, &c., of which the following is a specification, reference being had to the accompanying drawings.

My invention relates to reaches, and has for its object to provide a new and improved reach which may be economically and efficiently manufactured of steel without being objectionably heavy; also to provide certain improvements in reaches by which the reach may be readily adjusted for increasing or reducing the distance between the front and rear wheels of a vehicle; and also to provide improved means for connecting the forward end of the reach to the usual king-bolt. I accomplish this object as illustrated in the drawings and as hereinafter described.

That which I believe to be new is set forth in the claims.

In the accompanying drawings,—Figure 1 is a plan view of my improved reach, showing it applied to the hounds and the rear axle of a wagon or similar vehicle; Fig. 2 is a plan view of the reach; Fig. 3 is an edge view thereof; Fig. 4 is a vertical cross-section on line 4—4 of Fig. 1; Fig. 5 is an enlarged detail, being a plan view of the block by which the reach is connected with the hounds of the rear axle so that it may be adjusted longitudinally; Fig. 6 is a plan view showing a block provided at the front end of the reach as a means of attaching the same to the front axle through the usual king-bolt; and Fig. 7 is a view showing a block for the same purpose as that shown in Fig. 5, but made of cast-iron.

Referring to the drawings,—8—9 indicate the outer or side members of the reach, which, as shown in Fig. 4, are channel-bars, preferably of steel. At their rear ends these channel-bars are connected by a block 10, preferably of wood, which fits between them and is fixedly secured by rivets 11, or in any suitable way. Preferably, the rear end of the block 10 is rounded and projects slightly beyond the rear ends of the side members 8—9, as best shown in Figs. 2 and 3.

12 indicates a block, which, in the construction shown in Fig. 5, is made of wood and is edged on three sides with a metal strap 13 secured to the block by rivets 14. The block 12 is provided with a transverse hole 15, which is adapted to register with one or another of a series of registering holes 16 in the side bars 8—9, so that by passing a bolt 17 through the holes 16 and through the hole 15, the reach may be locked to the block 12, and endwise movement thereof prevented. The bolt 17 may be secured in place by a cotter-pin, or an equivalent device, 18. The side bars 8—9 are spaced apart sufficiently to make the reach of proper width to fit between the members 19—20 of the hind hounds, as shown in Fig. 1. Metal plates 21 extend over and under the reach at the forward end of the hind hounds and are secured thereto in any suitable way, as by rivets 22.

23 indicates a pin which passes vertically through the plates 21 and through the block 12, which is provided with an opening 24 registering with suitable openings in the plates 21. The block 12 is also provided with a U-shaped metallic strap 25, which extends longitudinally and centrally thereof over the forward end of the block 12 from a point slightly back of the upper and lower ends of the hole 24. Thus, the strap 25 reinforces the block 12 and relieves it of strain. In like manner, I secure the front ends of the side members 8—9 together and provide means for attaching them to the front axle by using a block 26, very similar to the block 12, fitted between the front ends of the side members and secured by bolts 27 passing horizontally through said block 26 and the side members. The block 26 also is provided with a strap 28 which extends around it on three of its side margins and is secured by rivets 29. Also, the block 26 is provided with a U-shaped strap 30 corresponding with the strap 25, except that it extends rearwardly from the central portion of said block instead of forward as in the case of the block 12. The strap 30 is provided with a hole 31 through which the usual king-bolt passes.

By this construction I provide a very strong and yet light reach, which is readily adjustable to vary the distance apart of the front and rear wheels, and which is very durable since the wear of the bolt securing the reach to the hounds and front axle is taken by the straps 25 and 30. These straps may easily be renewed whenever necessary.

That which I claim as my invention, and desire to secure by Letters Patent, is,—

1. A reach, comprising two oppositely-disposed channel-bars, blocks fitted between the end portions thereof for connecting them together and spacing them apart, and means disposed intermediately of the reach for adjustably connecting the same with the hind hounds of a vehicle.

2. A reach, comprising two oppositely-disposed channel-bars, blocks fitted between the end portions thereof for connecting them together and spacing them apart, and a block movably fitted between the members of the reach intermediately of the length thereof for adjustably connecting the same with the hind hounds of a vehicle.

3. A reach, comprising two oppositely-disposed channel-bars, blocks fitted in the channels of the end portions of said bars and secured thereto, and a block slidably fitted between the members of the reach, the latter block having a vertical hole to receive a coupling for connecting the same to the hind hounds of a vehicle.

4. A reach, comprising two oppositely-disposed channel-bars, blocks at the end portions thereof for securing the members of the reach together, a block slidably mounted between said members of the reach intermediately of the length thereof, said block having a horizontal hole, and holes in said members of the reach adapted to register with the hole in said intermediate block for securing the said block in different positions longitudinally of the reach.

5. A reach, comprising two oppositely-disposed channel-bars, blocks fitted between the end portions thereof for securing them together, a block slidably mounted between said bars intermdiately of the length thereof, said block having a U-shaped strap extending over the upper and lower surfaces thereof, said strap being perforated for the passage of a coupling-pin for coupling the reach to the hind hounds of a vehicle.

6. A reach, comprising two oppositely-disposed channel-bars, blocks fitted between the end portions thereof for securing them together, a block slidably mounted between said bars intermediately of the length thereof, said block having a U-shaped strap extending over the upper and lower surfaces thereof, said strap being perforated for the passage of a coupling-pin for coupling the reach to the hind hounds of a vehicle, and a metal strap at the sides of said block.

7. A reach, comprising two oppositely-disposed channel-bars, a block fitted between the rear ends of said bars for securing them together, a block fitted between the forward ends of said bars for securing them together and providing means for attaching the reach to the front axle, said block having a U-shaped strap extending over its upper and under surfaces, said strap being perforated to receive a king-bolt, and means for attaching the reach to the hind hounds of a vehicle.

8. A reach, comprising two oppositely-disposed channel-bars, a block fitted between the rear ends of said bars for securing them together, a block fitted between the forward ends of said bars for securing them together and providing means for attaching the reach to the front axle, said block having a U-shaped strap extending over its upper and under surfaces, said strap being perforated to receive a king-bolt, a strap extending over the two side margins of said front block and secured thereto, and means for attaching the reach to the hind hounds of a vehicle.

MARTIN E. ANDERSON.

Witnesses:
C. A. ANDERSON,
AXEL SKOGLUND.

Copies of this patent may be obtained for five cents each, by addressing the "Commissioner of Patents, Washington, D. C."